C. N. BEAL.
AUTOMOBILE TURN TABLE.
APPLICATION FILED AUG. 28, 1912.
1,069,843.
Patented Aug. 12, 1913.
2 SHEETS—SHEET 1.
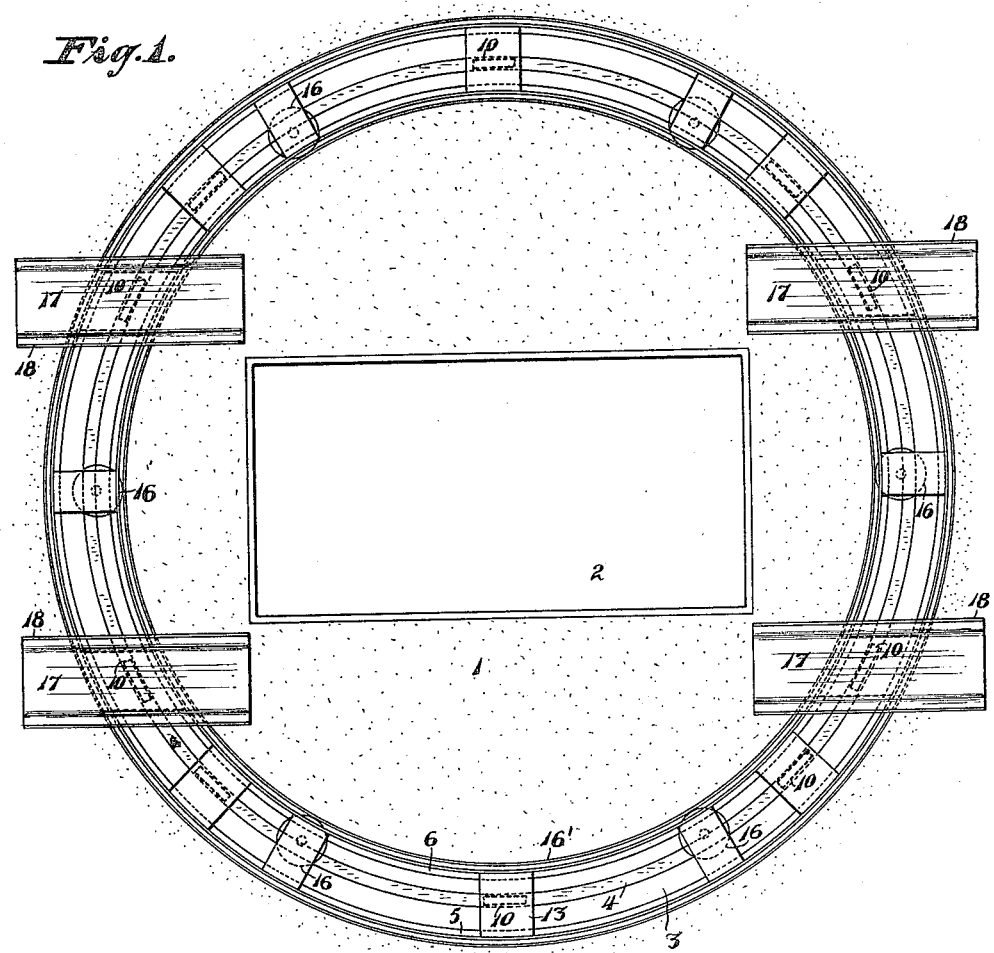
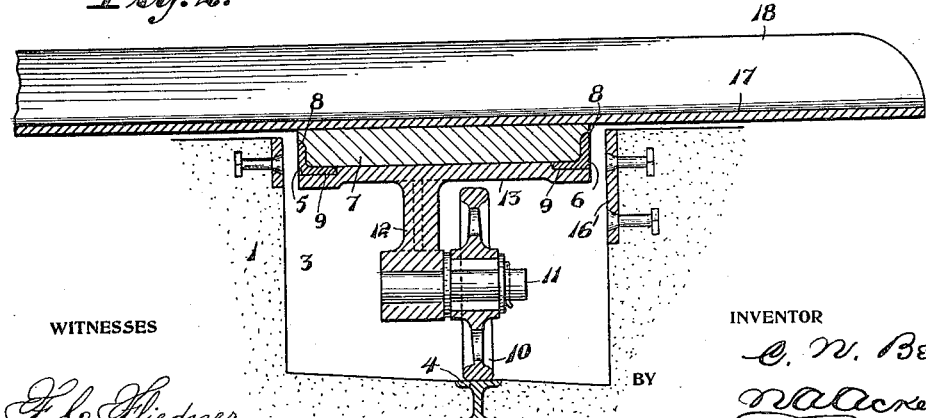
WITNESSES
INVENTOR
C. N. Beal
BY
ATTORNEY C. N. BEAL.
AUTOMOBILE TURN TABLE.
APPLICATION FILED AUG. 28, 1912.
1,069,843.
Patented Aug. 12, 1913.
2 SHEETS—SHEET 2.
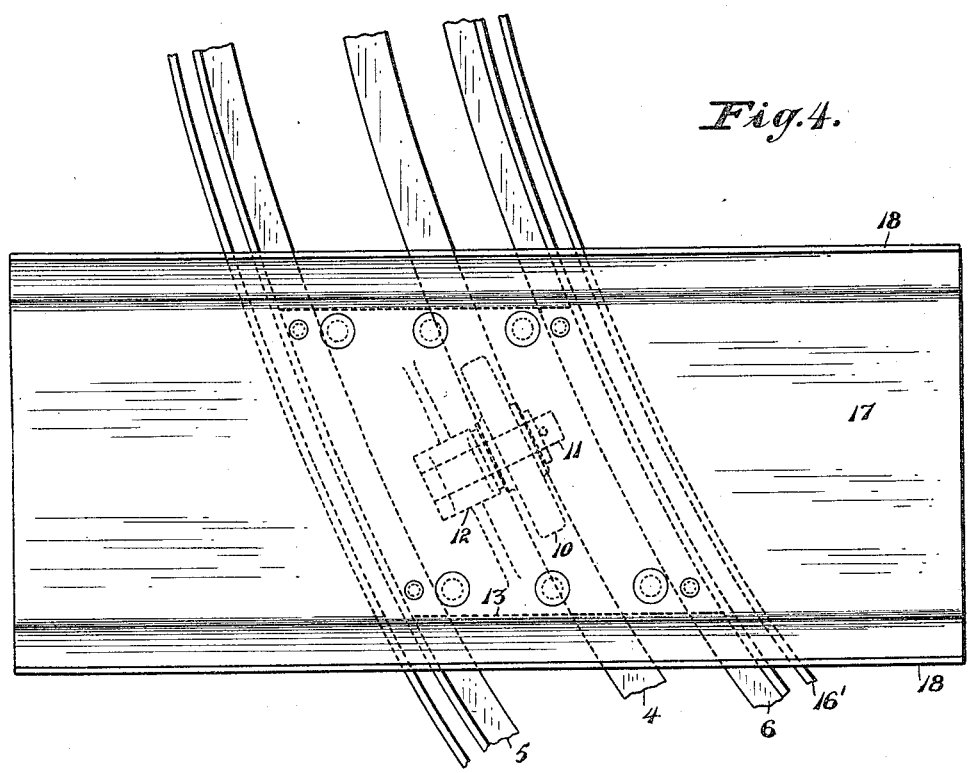
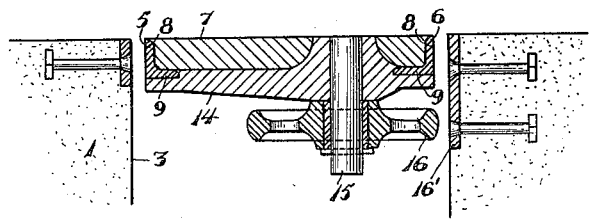

UNITED STATES PATENT OFFICE.

CARROLL N. BEAL, OF SAN FRANCISCO, CALIFORNIA.

AUTOMOBILE TURN-TABLE.

1,069,843.　　　　　Specification of Letters Patent.　　Patented Aug. 12, 1913.

Application filed August 28, 1912.　Serial No. 717,600.

*To all whom it may concern:*

Be it known that I, CARROLL N. BEAL, a citizen of the United States, residing in the city and county of San Francisco and State of California, have invented certain new and useful Improvements in Automobile Turn-Tables, of which the following is a specification.

The present invention relates to an improved turn-table particularly designed for use in garages or the like, and adapted for the receiving and turning of vehicles, in repairing, washing, or directing the same about the garage, and has for its principal object to provide a turn-table constructed in the form of an annular ring and arranged circumferentially about a garage repair pit, that access may be had to the entire underneath parts of a vehicle when the same is on the table.

Another object of the invention is to provide a turn-table of the above described type which is positioned surrounding a suitable shaped repair pit and the upper surface of which is approximately flush with the garage floor and is provided with suitably arranged vehicle wheel ways that the vehicle may be easily run onto the table, and that the table is capable of accommodating vehicles having different length wheel bases.

The invention consists in a turn-table comprising an annular bed or platform supporting bearings carried by and spaced at intervals on the underside of said bed or platform, an annular trackway positioned within a recess formed in the surface of the ground and on which said supporting bearings revolve, thrust bearings carried by and positioned at intervals on the underside of said bed or platform, an annular trackway on which said thrust bearings revolve, and vehicle wheelways positioned on the upperside of said bed or platform for supporting the vehicle when the same is positioned thereon.

With the above mentioned and other objects in view the invention consists in the construction and novel combination of parts, hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To fully comprehend the invention reference should be had to the accompanying sheets of drawings disclosing one form of my invention, wherein—

Figure 1 is a plan view of my improved turn-table, the same arranged annularly of a repair pit, and disclosing in dotted lines the position of the supporting journals and thrust bearings, and in full lines the vehicle wheel ways for supporting the vehicle when the same is positioned on said table, the table being positioned relative to the repair pit to receive a vehicle. Fig. 2 is an enlarged detail sectional view taken on line 2—2, Fig. 1, disclosing the construction of the bed or platform, one of the supporting journals and one of the vehicle wheel-ways. Fig. 3 is an enlarged sectional view taken on line 3—3 Fig. 1, disclosing one of the thrust bearings and the mounting therefor. Fig. 4 is an enlarged plan view of one of the supporting journals.

Referring more particularly to the drawings, the reference numeral 1 designates a suitable base, preferably of concrete, and in said base is formed a suitable repair pit 2, which facilitates in repairing the underneath mechanisms of a vehicle.

An annular channel 3, substantially rectangular in cross section, is formed in the base 1 surrounding the repair pit 2, and in the bottom of said channel 3 is seated a suitable track 4, which extends longitudinally of the channel, and which supports my improved turn-table.

The bed or platform comprises a pair of parallel spaced angle bars 5 and 6 extending annularly of and spaced from the side edges of the channel 3, the said angle bars being united by and secured to a suitable flooring 7 which is positioned between the vertical outside edges 8 of said bars, and rests on the horizontal edge 9 thereof. The upper surface of the flooring 7 is supported slightly above the level of the base 1 by supporting wheels 10, which rest on the track 4 and which are rotatably carried by suitable spindles 11 projecting laterally from the lower ends of arms 12, the arms being integral with and depended downwardly from the underside of substantially rectangular plates 13, the plates are detachably secured to the underside of and connect the angle bars 5 and 6, as in Fig. 2 of the drawings. The wheels 10 and parts associated therewith being hereinafter termed supporting journals are arranged in spaced relation to each other, as in Fig. 1 of the drawings. The bed or platform is also provided on its underside with suitable thrust bearings arranged in spaced relation to each other, as in Fig. 1 of the drawings, and the thrust bearings preventing movement of the bed or platform transversely of the channel 3. Each of the thrust bearings consists of a plate 14 secured to the underside of and connecting the angle frame bars 5 and 6, and through which plate projects a suitable vertical shaft 15 on which is rotatably mounted a wheel 16, the shaft is so positioned in the plate and the wheel is of sufficient diameter that the periphery thereof projects slightly beyond the inner peripheral edge of the frame, and is adapted to contact with a suitable track 16' secured to and extending annularly of the upper edge of the inner wall of the channel 3.

Arranged in pairs, and positioned at diametrically opposite sides of the annular frame with their longitudinal centers in alinement are oblong vehicle wheel ways 17, the ends of which overhang the frame, as in Fig. 1 of the drawings, and permit vehicles having different wheel bases to be received by the table. The longitudinal side edges of the wheel ways 17 are preferably curved upwardly, as at 18, to prevent the vehicle wheels from slipping laterally off the same, and the wheel-ways are secured in any suitable manner to the floor 7, preferably over a supporting journal, as in Fig. 1 of the drawings.

From the above description it will be observed that a turn-table in the form of an annular ring has been provided, that is capable of accommodating cars having various wheel bases, is designed for use in connection with a repair pit and one that is composed of few parts and may be constructed at a low cost.

Having thus fully described the invention what is claimed as new and is desired to protect by Letters Patent is—

1. A turn-table for automobiles or similar vehicles, the same comprising an annular trackway located within the sphere of an annular channel, an annular platform located in said channel above said trackway, journals mounted on said platform and resting on said annular trackway, thrust bearings mounted on said platform and adapted to contact with one edge of said annular channel, and vehicle wheelways positioned on the surface of said annular platform for receiving a vehicle and supporting the same on said platform.

2. A turn-table for automobiles or similar vehicles, the same comprising an annular trackway located within the sphere of an annular channel, an annular platform located in said annular channel above said trackway, journals mounted on the underside of said platform and resting on said annular trackway, thrust bearings mounted on the underside of said platform, an annular trackway located within the side walls of said annular channel and on which said thrust bearings revolve, and vehicle wheelways mounted on the surface of said annular platform and projecting beyond the peripheral edges thereof.

3. In an apparatus for the described purpose, the combination with an annular trackway mounted within the sphere of an annular channel, an annular platform rotatably mounted in said annular channel above said annular trackway, said platform surrounding a vehicle repair pit formed below the plane thereof, journals carried by said annular platform and resting on said annular trackway, thrust bearings carried by said annular platform, a trackway located within the side walls of said annular channel and on which said thrust bearings revolve, and vehicle wheelways mounted on the surface of said annular platform and projecting beyond the peripheral edges thereof.

In testimony whereof I have signed my name to this specification in the presence of two subscribing witnesses.

CARROLL N. BEAL.

Witnesses:
HARRY H. TOTTEN,
D. B. RICHARDS.

---

Copies of this patent may be obtained for five cents each, by addressing the "Commissioner of Patents, Washington, D. C."